United States Patent [19]

Kimura et al.

[11] Patent Number: 4,884,200
[45] Date of Patent: * Nov. 28, 1989

[54] SIGNAL DETECTING METHOD IN AUTORADIOGRAPHY

[75] Inventors: Tsutomu Kimura; Kazuhiro Hishinuma, both of Kanagawa, Japan

[73] Assignee: Fuji Photo Film Co., Ltd., Kanagawa, Japan

[*] Notice: The portion of the term of this patent subsequent to May 12, 2004 has been disclaimed.

[21] Appl. No.: 595,504

[22] Filed: Mar. 30, 1984

[30] Foreign Application Priority Data

Mar. 31, 1983 [JP] Japan .................. 58-57418

[51] Int. Cl.$^4$ .............. G03B 41/16; G01N 33/50; G01N 27/26; G01T 1/29
[52] U.S. Cl. .............................. 364/413.13; 382/6
[58] Field of Search .............. 364/414, 413; 250/484.1, 372.2, 303, 458.1, 459.1, 461.2; 435/35, 803, 808; 382/6; 935/76, 77

[56] References Cited

U.S. PATENT DOCUMENTS

| Re. 31,847 | 3/1985 | Luckey | 250/327.2 |
|---|---|---|---|
| 4,258,264 | 3/1981 | Kotera et al. | 250/459.1 X |
| 4,315,318 | 2/1982 | Kato et al. | 364/414 X |
| 4,320,415 | 3/1982 | Jones | 382/6 X |
| 4,389,670 | 6/1983 | Davidson et al. | 358/211 X |
| 4,496,973 | 1/1985 | Horikawa et al. | 364/414 X |
| 4,526,865 | 7/1985 | Silman | 435/803 |

FOREIGN PATENT DOCUMENTS 0738602  6/1980  U.S.S.R. ................ 364/413

OTHER PUBLICATIONS

Sanger, F. et al, "DNA Sequencing with Chain-Terminating Inhibitors", Proc. Natl. Acad. Sci U.S.A., vol. 74, No. 12 pp. 5463–5467, 12/1977.
Smith, L. et al, "Fluorescence Detection in Automated DNA Sequence Analysis", Nature, vol. #321, 6/12/1986 pp. 674–678.

*Primary Examiner*—Jerry Smith
*Assistant Examiner*—Charles B. Meyer
*Attorney, Agent, or Firm*—Gerald J. Ferguson, Jr.

[57] ABSTRACT

A signal detecting method in autoradiography, which is applied to an autoradiograph having locational information on radioactively labeled substances such as radioactively labeled biopolymers distributed one-dimensionally, being recorded on a radiosensitive material as a visible image,
which comprises steps of:

(1) preliminarily scanning a part of the radiosensitive material with a light and photoelectrically reading out a portion of the visualized autoradiograph to give an electric signal, to which a signal processing is applied, to determine one-dimensional distribution direction of the radioactively labeled substances; and (2) finally scanning the radiosensitive material with a light along said one-dimensional distribution direction and photoelectrically reading out the visualized autoradiograph, to obtain the locational information on the radioactively labeled substances as a digital signal.

7 Claims, 2 Drawing Sheets

SIGNAL DETECTING METHOD IN AUTORADIOGRAPHY

BACKGROUND OF THE INVENTION

1. Field of the Invention

This invention relates to a signal detecting method in autoradiography.

2. Description of the Prior Art

Autoradiography has been known as a method for obtaining locational information on radioactively labeled substances distributed in at least one-dimensional direction to form a row or rows on a support medium.

For instance, autoradiography comprises steps of: labeling organism-originating biopolymers such as proteins or nucleic acids with a radioactive element; resolving the radioactively labeled biopolymers, derivatives thereof, or cleavage products thereof (referred to hereafter as "radioactively labeled substances") on a gel support (support medium) through a resolving process such as electrophoresis to form a resolved pattern of the radioactively labeled substances (the resolved pattern is not visible); placing said gel support and a high-sensitivity type X-ray film together in layers for a certain period of time to expose said film and developing said film to give the autoradiograph of the resolved pattern as a visible image on the film; and obtaining the locational information on the radioactively labeled substances from said visible image. Further, the identification of the polymeric substances, determination of molecular weight of the polymeric substances and isolation of the polymeric substances can be performed based on the obtained locational information. The autoradiography has been effectively utilized for determining the base sequence of nucleic acids such as DNA.

In the autoradiography utilizing the above-mentioned radiographic process, the autoradiograph is analyzed through visual judgement of investigators. Instead of the above analytical method, a digital signal processing method for obtaining information on one-dimensional location of radioactively labeled substances in the form of symbols and/or numerals, which comprises reading out the visualized autoradiograph photoelectrically to give a digital signal and applying an appropriate signal processing to the digital signal, is described, for instance, in Japanese Patent Application No. 58(1983)-1336 (corresponding to U.S. patent application Ser. No. 06/568875 and European patent application No. 84100147.2). Said signal processing method comprises steps of: determining a one-dimensional scanning line (namely one-dimensional distribution direction of the radioactively labeled substances) for signal processing with respect to the obtained digital signal, and detecting sampling points on the scanning line. The term "scanning" in this method means the numeral scanning on the digital image data.

According to the above-mentioned signal processing method, the information on one-dimensional location of the radioactively labeled substances, which has been conventionally obtained through visual judgement by investigators, can be obtained automatically and accurately in the desired form such as symbols and/or numerals. Consequently, the above-mentioned signal processing method improves the accuracy of locational information and brings about an increase of the amount of information obtained.

Another signal processing method in the autoradiography utilizing the radiography, which comprises determining the scanning line for detecting sampling points with respect to the obtained digital signal, is described in Japanese patent application No. 58(1983)-1337 (the content of which is disclosed in U.S. patent application Ser. No. 568,873 and European Patent Application No. 84100149.8).

In any signal processing method described above, the one-dimensional distribution direction (scanning line on the digital image data for detecting sampling points) of the radioactively labeled substances is determined, after the digital signal corresponding to the autoradiograph having the locational information on the radioactively labeled substances is obtained by photoelectrically reading out the autoradiograph visualized on the radiosensitive material. Therefore, the obtained digital signal is initially stored in a memory of a signal processing circuit and subsequently the digital signals is selectively taken out of the memory according to the signal processing operation, so as to determine the one-dimensional distribution direction of the radioactively labeled substances.

More in detail, the read-out of the radiosensitive material is carried out over its entire surface and the digital image data are inevitably obtained even on a vacant area of the sheet which does not give any locational information on radioactively labeled substances. That is, all of the digital signal which is obtained by detecting on the entire surface of the radiosensitive material should be temporally stored in the memory of the signal processing circuit, and thus the memory requires a great capacity for storing it.

Additionally, the photoelectrically read-out operation on the radiosensitive material requires a long period of time, because the operation should be carried out over the entire surface thereof.

SUMMARY OF THE INVENTION

Accordingly, an object of the present invention is to provide a signal detecting method in autoradiography for efficiently detecting a digital signal having the locational information on radioactively labeled substances.

The object can be accomplished by preliminarily scanning with a light a part of the radiosensitive material on which an autoradiograph having the information on one-dimensional location of the radioactively labeled substances is recorded, to determine one-dimensional distribution direction of the radioactively labeled substances; and subsequently scanning with a light the same radiosensitive material along said one-dimensional distribution direction to obtain the locational information on the radioactively labeled substances as a digital signal.

That is, the present invention provides a signal detecting method in autoradiography, which is applied to an autoradiograph having locational information on radioactively labeled substances distributed one-dimensionally, being recorded on a radiosensitive material as a visible image, which comprises steps of:

(1) scanning the radiosensitive material with a light in at least two different positions in such a manner that each scanning traverses the one-dimensional distribution of the radioactively labeled substances and photoelectrically reading out a portion of the visualized autoradiograph to give an electric signal, to which is applied a signal processing comprising stages of:

detecting distribution points of the radioactively labeled substances for each scanning, and preparing a continuous line selected from the group consisting of a straight line, a polygonal line and a curved line along the corresponding distribution points of the radioactively labeled substances for each scanning, to assign said continuous line to one-dimensional distribution direction of the radioactively labeled substances; and (2) scanning the radiosensitive material with a light along said one-dimensional distribution direction of the radioactively labeled substances determined in the step (1) and photoelectrically reading out the visualized autoradiograph, to obtain the locational information on the radioactively labeled substances indicated by said autoradiograph as a digital signal.

In the present invention, the term "locational information" of the radioactively labeled substances means includes a variety of information relating to the location of the radioactively labeled substances, or the aggregation thereof, being present in the sample, such as the location, the shape, the concentration, the distribution and combinations thereof.

DETAILED DESCRIPTION OF THE INVENTION

Figure 1:
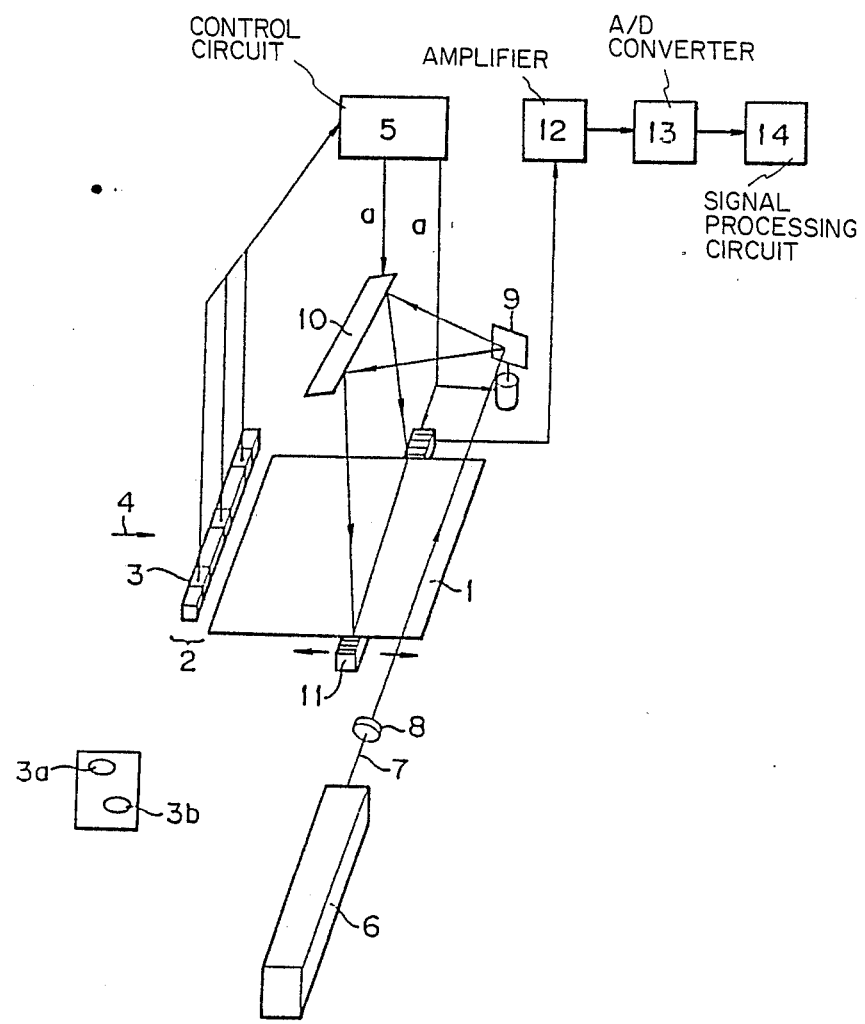
FIG. 1 shows an embodiment of the read-out system for reading out or detecting the locational information on the radioactively labeled substances in a sample recorded on a radiosensitive material in accordance with the present invention.

According to the present invention, the period of time required for reading out the locational information can be shortened, by preliminarily scanning a radiosensitive material with a light of low intensity to determine the one-dimensional distribution direction of the radioactively labeled substances, and subsequently scanning the same radiosensitive material along said one-dimensional distribution direction with a light to obtain the locational information on the radioactively labeled substances as a digital signal. More in detail, the readout (scanning with a light) of the autoradiograph recorded on the radiosensitive material does not have to be carried out over the entire surface thereof, but is carried out only in a certain area along the one-dimensional distribution direction of the radioactively labeled substances, so that the longer period of time which has been required in the conventional read-out operation is greatly shortened.

Further, it is not required to store the digital signal corresponding to the autoradiograph obtained by scanning the entire surface of the radiosensitive material in the memory of the signal processing circuit, which is different from the conventional read-out operation, but the digital signal only in a certain area along the one-dimensional distribution direction of the radioactively labeled substances, namely only the digital signal which provides the locational information on the radioactively labeled substances, can be stored in the memory, and thereby the required memory capacity can be greatly reduced.

Furthermore, according to the present invention, the one-dimensional distribution (resolution) direction of the radioactive labeled substances on an autoradiograph can be detected automatically to determine a scanning direction for detection of the digital signal, even in the case that there occurs overall distortion or dislocation of the autoradiograph recorded on the radiosensitive material, which is brought about by locational distortion of a resolved row of the radioactively labeled substances on the support medium in the resolving procedure or by incorrect arrangement between the support medium carrying the resolved row of radioactively labeled substances and the radiosensitive material in the exposing procedure. Based on the thus determined scanning direction, the information on one-dimensional location of the radioactively labeled substances can be obtained with a high accuracy. Further, in the case that the autoradiograph is composed of a plurality of resolved rows of the radioactively labeled substances distributed in one-dimensional directions, the distribution direction of every resolved row having the distortion can be accurately detected to determine a scanning direction for each row.

In the present invention, the term "one-dimensional distribution" means a pattern which comprises the radioactively labeled substances spread in one direction in the form of a row of bands or spots, such as an electrophoretic row resolved through electrophoresis.

Examples of the sample employable in the present invention include a support medium on which radioactively labeled substances are distributed (e.g., resolved) in a one-dimensional direction to form a distributed row (e.g., resolved row). Examples of the radioactively labeled substances include biopolymers, derivatives thereof, or cleavage products thereof, labeled with a radioactive substance.

For instance, in the case that the radioactively labeled biopolymers are polymeric substances such as protein and nucleic acid, derivatives thereof and cleavage products thereof, the present invention is useful for isolation and identification thereof. Further, the present invention can be effectively used to analyze the whole or partial molecular structures of these biopolymers and the basic segmental constitutions thereof. In particular, the present invention can be effectively used to determine the base sequence of nucleic acid such as DNA.

Representative examples of the method for resolving (or developing) the radioactively labeled substances on a support medium include an electrophoresis using one of various resolving mediums such as a gel in the form of layer, column or the like, a molded polymer film such as a cellulose diacetate film, and a filter paper, and a thin layer chromatography using a support of material such as silica gel. However, the method employable in the present invention is by no means restricted by these methods.

Samples employable in the present invention are by no means restricted to the above-mentioned samples, and any other samples can be used, provided that the sample is radioactively labeled substances distributed in at least one-dimensional direction and is capable of having an autoradiograph with the locational information thereof to be recorded on a radiosensitive material.

The radiosensitive material used in the present invention has a basic structure comprising a support and a radiographic (photographic) emulsion layer. The radiographic emulsion layer comprises a binder such as gelatin and silver halide dispersed therein. For instance, the radiosensitive material is prepared by providing the above-mentioned emulsion layer onto the transparent support such as a polyethylene terephthalate sheet. A representative example of the radiosensitive material includes a radiographic film such as a high-speed type X-ray film.

In carrying out the exposing procedure, that is, the procedure of exposing the radiosensitive material to the radiation emitted from the support medium containing the radioactively labeled substances, at least a portion of the emitted radiation is absorbed by the radiosensitive substance of the radiosensitive material by placing the support medium and radiosensitive material together in layers for a certain period of time. The exposure can be accomplished by keeping the radiosensitive material in a position adjacent to the support medium, for instance, at a low temperature such as a temperature lower than 0° C. for at least several days, and then the radiosensitive material is developed. In the exposing procedure, it is further possible to enhance the radiographic speed of the radiosensitive material by using a radiographic intensifying screen or applying thereto a preliminary exposure such as a flash exposure.

The exposing procedure of the radiosensitive material to a sample and the developing procedure thereof in the autoradiographic process have been well known, and are described, for instance, in the following literature: Method in Biochemical Experiment, Volume 6, Method in Tracer Experiment I, 271-289, "8. Autoradiography" by Toru Sueyoshi and Akiyo Shigematsu (Tokyo Kagaku Dozin Ltd., 1977).

The signal detecting method according to the present invention for reading out the information on one-dimensional location of the radioactively labeled substances recorded on the radiosensitive material and obtaining it in the form of a digital signal will be described in detail hereinafter, referring to an embodiment of a read-out system shown in FIG. 1 of the accompanying drawings and concerning an example of an autoradiograph obtained by resolving a mixture of radioactively labeled substances on a support medium through a resolving method such as electrophoresis.

Figure 2:
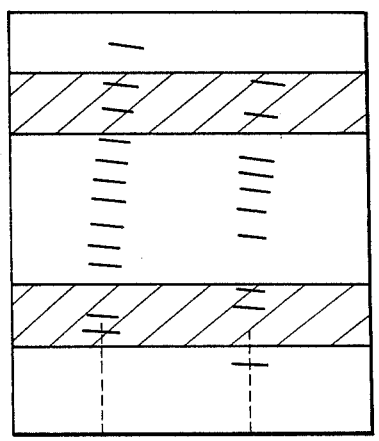
FIG. 2 shows an example of the autoradiograph of a sample comprising the radioactively labeled substances resolved on a support medium, which is recorded on a radiosensitive material.

FIG. 1 schematically illustrates an embodiment of the read-out system for reading out an autoradiograph recorded on a radiosensitive material 1 as a visible image, which has the information on the one-dimensional location of radioactively labeled substances (an example is shown in FIG. 2).

FIG. 2 schematically illustrates an example of the autoradiograph of a sample recorded on the radiosensitive material, said sample being composed of plural kinds of the radioactively labeled substances which are resolved in the longitudinal direction on the support medium to form two resolved rows. The autoradiograph on the radiosensitive material shown in FIG. 2 is an example having a distortion due to the incorrect arrangement between the support medium and radiosensitive material in the exposing procedure, or the like.

At first, the preliminary read-out operation is carried out in the following manner.

Laser beams generated by a sensor 2 impinge upon the radiosensitive material 1. The sensor 2 comprises a number of optical heads 3 and is positioned adjacent to the radiosensitive material 1. Each optical head 3 comprises a laser diode 3a for generating laser beam and a photosensor 3b for detecting the laser beam reflected by the radiosensitive material 1. A set of the laser diodes 3a and a set of the photosensors 3b are so arranged that the light-radiating faces of the laser diodes 3a and the light-receiving faces of the photosensors 3b are located in parallel with each other in the sensor 2. The sensor is so arranged downwardly that the sensor 2 can be located in parallel with the radiosensitive material 1. The number of optical heads 3 is coincident with the number of scans needed for determination of the one-dimensional distribution direction of the radioactively labeled substances, and the sensor 2 has at least two of the optical heads.

The radiosensitive material 1 is transferred in the direction along the arrow 4 under the irradiation of the above-mentioned laser beam, wherein the radiosensitive material 1 is so positioned that the transferring direction represented by the arrow 4 traverses the one-dimensional distribution of the radioactively labeled substances recorded on the radiosensitive material 1. Accordingly, when the radiosensitive material 1 is transferred in the direction along the arrow 4, the laser beams whose number coincides with the number of optical heads 3 are simultaneously irradiated in parallel with each other on the radiosensitive material 1. Each laser beam has a sufficiently large beam diameter which is generated by the laser diode 3a to perform the scanning with the laser beam with such a width as to catch at least one distributed portion of the radioactively labeled substances for each distributed row.

Each laser beam reflected by the radiosensitive material 1 impinges upon the photosensor 3b of the sensor 2. The photosensor 3b, for instance, comprises a solidstate imaging device such as CCD, or photomultiplier, etc. The reflected light (laser beam) detected by the photosensor 3b is converted into an electric signal and then input to a control circuit 5. That is, the electric signal with respect to the hatched areas shown in FIG. 2 is input to the control circuit 5.

Figure 3:
FIG. 3 is a graph showing the intensity distribution of signal in the area of one scanning.

In the control circuit 5, the obtained electric signal is subjected to the signal processing, and thus the one-dimensional distribution direction of the radioactively labeled substances is determined. During the signal processing, the obtained electric signal is temporally stored in a memory (buffer memory) in the control circuit 5. The signal processing for determination of the one-dimensional distribution direction of the radioactively labeled substances, for instance, is carried out as follows: At first, the distribution of intensity of the signal in each scanning area is calculated along the scanning direction to obtain such an intensity distribution as shown in FIG. 3. Each peak appearing in the intensity distribution is then assigned to a distribution point of the radioactively labeled substances in each scanning area, and a straight line (or polygonal line) is prepared among the corresponding distribution points in each scanning area, to be assigned determined aimed one-dimensional distribution direction of the radioactively labeled substances. Further, the obtained polygonal line may be approximated with a suitable curved line so that the one-dimensional distribution direction can be determined more accurately.

In the case of obtaining the electric signal in a great number of scanning areas, the distribution points of the radioactively labeled substances may be detected for all the scanning areas in the same manner as mentioned above to prepare a polygonal line among the corresponding distribution points, but it is also possible to selectively find certain preferable scanning areas followed by performing the above-mentioned processing only with respect to these scanning areas in order to simplify the signal processing and shorten the processing time.

To determine the one-dimensional distribution direction of the radioactively labeled substances more accurately, the distance between each scanning area is preferably as far as possible. When the one-dimensional distribution direction is determined using two scanning areas, it is desired to select such scanning areas as to be positioned at the top (or vicinity thereof) and the bottom (or vicinity theref) of the distribution row of the radioactively labeled substances.

Thus, the control circuit 5 outputs a scanning condition a of the light beam such as a scanning position, direction thereof and width thereof for the final read-out operation, according to the determined one-dimensional distribution direction of the radioactively labeled substances.

After finishing the preliminary read-out operation in the above-mentioned manner, the final read-out operation is carried out in the following manner.

Laser beam 7 generated by a laser source 6 for the final read-out passes through a lens 8 and is subsequently deflected by a movable beam deflector 9 such as a galvanometer mirror which is set on its deflection according to the above-mentioned light beam condition a, and reflected by a movable plane reflection mirror 10 which is also adjusted according to the scanning condition a. The deflected laser beam impinges one-dimensionally upon the radiosensitive material 1. The movable beam deflector 9 and movable plane reflection mirror 10 should be continually adjusted according to the scanning condition a output from the control circuit 5. Consequently, the deflected laser beam is irradiated on the radiosensitive material 1 with a certain width along the one-dimensional distribution direction of the radioactively labeled substances.

Then, the deflected laser beam is transmitted by the radiosensitive material 1 and enters a movable line-sensor 11. The line-sensor 11 comprises a solid-state imaging device such as CCD or a combination of a light guiding device and a photomultiplier, and can be transferred in the direction along the arrow 4 according to the light beam scanning direction a. Accordingly, the movable line-sensor 11 is transferred with precise relation to the adjustment of both the movable beam deflector 9 and movable plane reflection mirror 10, so that the transmitted light (laser beam) along the one-dimensional distribution direction of the radioactively labeled substance is received by the movable line-sensor 11.

The transmitted light detected by the movable line-sensor 11 is converted to an electric signal, amplified in an amplifier 12 and input to an A/D converter 13. The electric signal is then converted to a digital signal in the A/D converter 13.

In the above description on the method according to the present invention for reading out the locational information on the radioactively labeled substances recorded on the radiosensitive material, the final read-out operation wherein the scanning direction of the laser beam is straight has been given, but the read-out operation according to the invention is not limited to the above-mentioned embodiment. In the case that the distribution direction of the radioactively labeled substances is approximated with a polygonal line or a curved line, it is also possible to perform the scanning of the light beam in such a manner that the scanning direction varies coincidently with the distribution direction.

Further, the above-described method has been given referring to the read-out system in which the preliminary read-out operation is performed with the different optical equipment from that for the final read-out operation, but the read-out system employable in the present invention is not limited to this one. For instance, it is possible to perform in the same optical equipment both the preliminary scanning with the light beam for determining the one-dimensional distribution direction of the radioactively labeled substances and the final scanning therewith for reading out the locational information along the determined distribution direction.

It is also possible that the spot diameter of light beam in the final read-out operation is set according to the light beam scanning condition output from the control circuit. By setting the spot diameter of light beam to a suitable scanning width, the final read-out operation is more simplified. This simplification enables elimination of numeral scanning on the digital image data when the obtained digital signal is subjected to a signal processing, because only the signal having the locational information is obtained, that is, the signal processing for obtaining the locational information can be also simplified.

The thus detected digital signal having the locational information on the radioactively labeled substances is input to a signal processing circuit 14, in which various signal processings are applied thereto to obtain the desired information in the form of symbols and/or numerals.

More in detail, through the processing, sampling points for detecting distributed portions of the radioactively labeled substances are determined based on the obtained digital signal. In the case that a plurality of distributed rows in the one-dimensional direction are concerned, the determined sampling points are compared and identified between corresponding positions on each distributed row, and thus the information on one-dimensional location of the radioactively labeled substances can be obtained as symbol and/or numeral.

Since the digital signal obtained according to the present invention is input for individual distributed rows, the determination of scanning direction (one-dimensional distribution direction) for detecting the sampling points is not required on the digital image data.

In addition, the amount of digital signal to be stored in the memory (buffer memory or non-volatile memory such as magnetic disk) in the signal processing circuit 14 can be decreased greatly, because the signal only in a certain area along the distribution direction of the radiosensitive material is detected.

In the above-mentioned example shown in FIG. 2 and FIG. 3, the case of two distributed rows of the radioactively labeled substances is illustrated, but the signal detecting method of the present invention is not limited to this case and also applicable to any cases wherein the distributed row such as a resolved row is single or plural such as three or more.

The signal processing to determine the one-dimensional distribution direction of the radioactively labeled substances in the control circuit is not limited to the above-mentioned one, but for instance, the same processing as the digital signal processing described in aforementioned Japanese patent application No. 57(1982)-1337 may be employed.

By employing the signal detecting method of the present invention for obtaining the locational information on the radioactively labeled substances distributed in one-dimensional direction, the width (spot size) of individual distributed portion thereof can be reduced to approximately 3 mm, because initially the one-dimensional distribution direction thereof is determined and the signal is then detected along the distribution direction. Consequently, the amount of radioactively labeled substances per a resolved row can be decreased and the number of resolvable rows per a support medium can be increased. In other words, more information can be obtained in a single autographic process than that in the conventional autoradiographic process.

The signal detecting method in autoradiography of the present invention is very useful, for instance, for determination of the base sequence of DNA or DNA fragment utilizing autoradiography such as Maxam-Gilbert method. In Maxam-Gilbert method, DNA or DNA fragment labeled with a radioactive element is base-specifically cleaved for each base unit concerning the four bases of constitutional units, the mixture of base-specifically cleavage products is resolved and developed by electrophoresis to obtain an autoradiograph, and then the base sequence of DNA or DNA fragment is determined form the obtained autoradiograph. By applying the signal detecting method of the present invention to the Maxam-Gilbert method, the resolved (developed) direction can be detected based on the electric signal and assigned to the scanning direction in the optical operation independently of the combination of base-specific cleavage products. Thus, the digital signal having the locational information on DNA bases can be obtained along the scanning direction.

We claim:

1. A signal detecting method in autoradiography, which is applied to an autoradiograph having locational information on radioactively labeled substances distributed one-dimensionally, being recorded on a radiosensitive material as a visible image, which comprises steps of:
(1) scanning the radiosensitive material with a light in at least two different positions in such a manner that each scanning traverses the one-dimensional distribution of the radioactively labeled substances and photoelectrically reading out a portion of the visualized autoradiograph to give an electric signal, to which is applied a signal processing comprising stages of:
detecting distribution points of the radioactively labeled substances for each scanning, and preparing a continuous line selected from the group consisting of a straight line, a polygonal line and a curved line along the corresponding distribution points of the radioactively labeled substances for each scanning, to assign said continuous line to one-dimensional distribution direction of the radioactively labeled substances; and
(2) scanning the radiosensitive material with a light along said one-dimensional distribution direction of the radioactively labeled substances determined in the step (1) and photoelectrically reading out the visualized autoradiograph, to obtain the locational information on the radioactively labeled substances indicated by said autoradiograph as a digital signal.

2. The signal detecting method in autoradiography as claimed in claim 1, wherein said scanning with the light in step (1) is carried out on the radiosensitive material in at least two different positions in such a manner that the scannings traversing the one-dimensional distribution of the radioactively labeled substances are made in parallel with each other.

3. The signal detecting method in autoradiography as claimed in claim 1, wherein said step (1) comprises:
scanning the radiosensitive material with a light in two different positions to obtain an electric signal, to which is applied a signal processing comprising stages of:
detecting distribution points of the radioactively labeled substances in two positions, and preparing a straight line between these two distribution points, to assign said line to one-dimensional distribution direction of the radioactively labeled substances.

4. The signal detecting method in autoradiography as claimed in claim 1, wherein the position and width of said scanning on the radiosensitive material with the light in the step (1) are set prior to the signal detecting as to match with the conditions of the one-dimensional distribution of the radioactively labeled substances under analysis.

5. The signal detecting method in autoradiography as claimed in claim 1, wherein the position and width of said scanning on the radiosensitive material with the light in the step (2) are determined in the step (1).

6. The signal detecting method in autoradiography as claimed in any one of the claims 1 through 5, wherein said one-dimensionally distributed radioactively labeled substances are biopolymers, derivatives thereof, or cleavage products thereof, labeled with a radioactive element and resolved in one-dimensional direction on the support medium.

7. The signal detecting method in autoradiography as claimed in claim 6, wherein said biopolymers are nucleic acids, derivatives thereof, or cleavage products thereof.

* * * * *